United States Patent [19] [11] 4,113,908
Shinomura [45] Sep. 12, 1978

[54] SYNTHETIC PAPER

[75] Inventor: Toshihiko Shinomura, Yokohama, Japan

[73] Assignee: Nippon Oil Company Ltd., Tokyo, Japan

[21] Appl. No.: 639,166

[22] Filed: Dec. 9, 1975

Related U.S. Application Data

[63] Continuation-in-part of Ser. No. 427,098, Dec. 21, 1973, abandoned.

[30] Foreign Application Priority Data

Dec. 28, 1972 [JP] Japan .................................. 48-1961

[51] Int. Cl.[2] ................................................ B32B 5/12

[52] U.S. Cl. .................................... 428/113; 428/188; 428/303; 428/309; 428/330

[58] Field of Search ............... 161/151, 159, 162, 164, 161/165, 168, 169, 181, 182, 203, 204, 205, 206, 227, 231, 252, 253, 254, 255, 256; 428/113, 188, 303, 309, 330, 331, 520, 522, 523

[56] References Cited

U.S. PATENT DOCUMENTS

| | | | |
|---|---|---|---|
| 3,551,538 | 12/1970 | Yamamoto et al. | 161/164 |
| 3,616,161 | 10/1971 | Bartl et al. | 161/168 |
| 3,741,841 | 6/1973 | Toyoda et al. | 161/252 |
| 3,741,860 | 6/1973 | Otsubo et al. | 161/162 |
| 3,758,661 | 9/1973 | Yamamoto et al. | 161/164 |
| 3,765,999 | 10/1973 | Toyoda | 161/162 |
| 3,783,088 | 1/1974 | Yoshiyasu et al. | 161/162 |
| 3,790,435 | 2/1974 | Tanba et al. | 161/162 |

*Primary Examiner*—William R. Dixon, Jr.

[57] ABSTRACT

Synthetic paper comprising a film base material formed from a thermoplastic resin and a filler composed of a large number of fibrous filaments and a pigment and uniformly scattered over the base material, the dispersed filaments and pigment having void spaces therearound, so that the resultant synthetic paper as a whole presents a whitish opague texture similar to Japanese paper, with a large amount of white threadlike patterns all over the base material.

9 Claims, 1 Drawing Figure

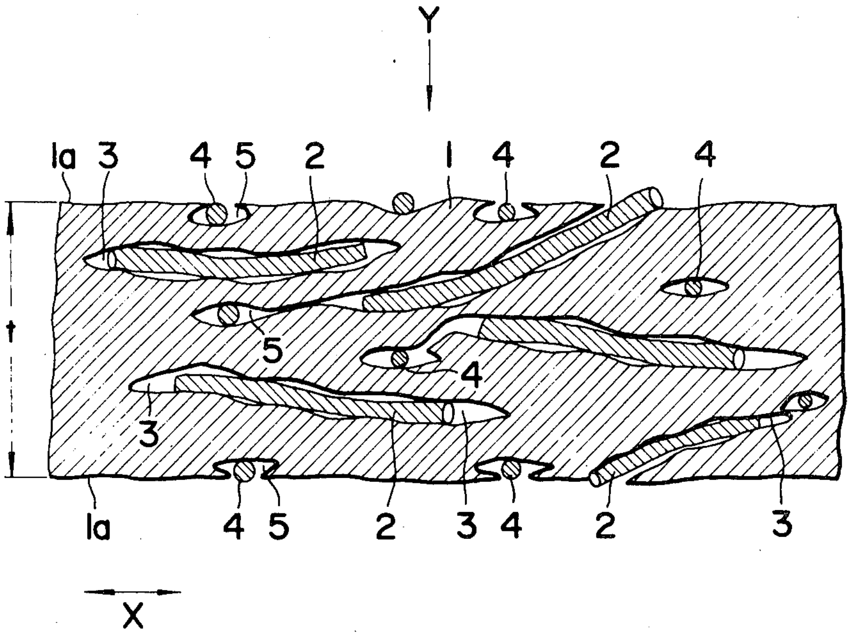
Y
la
3
4
5
2
1
4
2
4
t
5
4
3
la
4
5
2
3
4
2
3
X

SYNTHETIC PAPER

This application is a continuation-in-part of U.S. Ser. No. 427,098, Shinomura, filed Dec. 21, 1973 and entitled "Synthetic Paper".

FIELD OF THE INVENTION

This invention relates to synthetic paper which is excellent both in texture and in properties as writing paper.

BACKGROUND OF THE INVENTION

There have been heretofore proposed various kinds of synthetic paper using a synthetic resin as a base material. For example, known synthetic paper is prepared by forming a synthetic resin into a simple film, by mixing a synthetic fiber with a paper-forming synthetic resin with the addition of a foaming agent and forming the mixture into a film with foaming, or by stretching a synthetic resin film after admixing a pigment.

In general, however, the synthetic paper formed from a synthetic resin film is defective in ink absorptivity, mechanical strength, and texture. Furthermore, though the synthetic paper formed from the synthetic fiber-containing film (i.e., synthetic fiber paper) has good ink absorptivity, it nevertheless has rough surfaces, so that the paper is disadvantageously poor in texture to such a degree so as to be unsuitable for use as writing paper and it also requires high production costs. Synthetic paper other than the synthetic resin film paper or synthetic fiber paper is also defective in physical and mechanical properties similar to the above-mentioned synthetic paper, i.e., the same lacks ink absorptivity, mechanical strength, texture or secondary processability.

SUMMARY OF THE INVENTION

It is an object of the present invention to provide synthetic paper which can overcome the prior-art disadvantages and which is excellent in the various properties required for paper, and is particularly excellent in its texture and suitability for use as writing paper.

Another object of the present invention is to provide synthetic paper comprising a film base material formed from thermoplastic resin, a number of threadlike fibrous filaments dispersed in said film base material and said fibrous filaments each having a void space therearound, a portion of the void space being exposed on the surfaces of said film base material.

A further object of the present invention is to provide synthetic paper further including a large amount of pigment dispersed in said film base material, said pigment also having a void space therearound, a portion of said void space being exposed on the surfaces of said film base material.

In accordance with the present invention, there is provided synthetic paper using a thermoplastic resin film as a base material comprising a number of fibrous filaments dispersed in the film in such a manner as to form void spaces between said fibrous filaments and said base material, and a large amount of pigment dispersed in the film in such a manner as to form also void spaces between said pigment and said base material, a portion of the dispersed fibrous filaments and pigment being exposed on the surfaces of said base material.

A prominent feature of the present invention resides in the fact that the synthetic paper has excellent texture comparable to Japanese paper. As is well known in the art, Japanese paper has an excellent and unique texture, which, when used on a sliding-door, gives to the touch a feeling typical of the traditional artistic beauty of Japan. Particularly, when sunlight is transmitted through Japanese paper, it gives unparalleled aesthetic effects with agreeable softness.

The synthetic paper of the present invention can attain precisely the same effects as Japanese paper, and distinctively differs from existing synthetic paper in this respect.

Furthermore, the synthetic paper of the present invention is remarkably improved in its mechanical and physical properties such as elongation, various moduli, mechanical strengths, hardness, elasticity, creep resistance, propagation properties in tearing, owing to reinforcement of the thermoplastic resin base material by means of the fibrous filaments which are used as a filler.

Moreover, the synthetic paper has a relatively rough surface as a result of the formation of void spaces about the filler material, a portion of which is exposed on the surfaces of the paper, ensuring excellent ink absorptivity. A pencil, fountain-pen or ballpoint-pen can be used for clear writing on the synthetic paper. Additionally, the paper also is suitable for printing.

Thus, the synthetic paper of the invention has excellent characteristic properties and accordingly has versatile utility allowing applications to various fields to serve as synthetic paper or to take the place of Japanese and ordinary papers.

BRIEF DESCRIPTION OF THE DRAWING

For a better understanding of the nature and objects of the invention, reference will be made to the following detailed description taken in conjunction with the accompanying drawing, in which:

The FIGURE is a sectional view showing on an enlarged scale of the structure of the synthetic paper of the present invention.

DETAILED DESCRIPTION OF A PREFERRED EMBODIMENT

Referring to the drawing, a film base material indicated at 1 is formed from a thermoplastic resin including polyethylene, polypropylene, polystyrene, polyvinyl chloride, copolymers using the above-mentioned materials as a matrix, or mixtures thereof. The base material 1 is generally transparent and its surface 1*a* is relatively smooth. The base material 1 has a thickness *t* of several tens to several hundreds $\mu$.

Indicated at 2 are threadlike fibrous filaments of organic natural or synthetic fibers which are dispersed in large amount in the base material 1 and are oriented in a direction substantially parallel to the surface 1*a*. Some of the fibrous filaments 2 are partly exposed on the surface 1*a* of the base material 1. From the manner shown in the drawing, the fibrous material 2 might appear to be oriented all in a direction parallel to the paper surface (i.e., in the direction as shown by the arrow X in the drawing). However, in fact, when the base material is viewed from above, i.e., in the direction of arrow Y, the fibrous filaments 2 are crossed in all random directions, and uniformly dispersed in the base material 1.

The fibrous filaments 2 are selected from the group consisting of polyester fibers, polyamide fibers, polyacrylonitril fibers, polyvinylalcohol fibers, pulp, cotton, silk, and rayon fibers, and are in a threadlike form having a diameter in the range of about $1\mu$ to $50\mu$ and a length in the range of about 1mm to 5cm. The threadlike fibrous filaments 2 are dispersed in the base material 1 in such a manner that a portion of the filaments 2 is partly exposed from the surfaces of the base material 1. In this connection, 100 parts by weight of the base material 1 is generally admixed with about 2–80 parts by weight of the fibrous filaments 2.

Furthermore, small void spaces 3 are formed between the base material 1 and the fibrous filaments 2 in such a manner that each of the spaces 3 is formed around each of the fibrous filaments 2 over a length slightly greater than the total length of the fiber 2. Accordingly, the size of the space 3 is determined depending upon the size of the fibrous filaments 2, ordinarily having a width in the range of about 100Å–50μ and a length in the range of about 1mm–6cm. Such spaces 3 play an important role in the improvement of the characteristics of the synthetic paper in the invention.

This improvement can be seen visually as the light that has entered the synthetic paper is scattered at the spaces 3, imparting thereto and to adjoining portions a whitish opacity with various patterns appearing in the synthetic paper in close resemblance to a Japanese paper-like texture. Through a microscopic observation of the synthetic paper, it can be recognized that whitish thin threadlike lines are dispersed in all directions and in various configurations to constitute a texture similar to Japanese paper.

The pigment, generally in the form of a particulate material 4 is, preferably, dispersed in the base material in an amount of 5–40 parts by weight per 100 parts by weight of the base material. Examples of the pigment 4 include calcium carbonate, magnesium carbonate, titanium dioxide, calcium sulfate, calcium sulfite, clay, zinc white and the like, and the pigment is substantially spherical having a diameter in the range of from about 100Å to 50μ.

Around the pigment 4 are formed void spaces 5 substantially of ovate configuration and having a width in the range of from about 50Å–50μ, with the longitudinal direction of the oval void spaces aligned parallel to the plane of the surface 1*a*. A portion of the pigment 4 is also exposed on the surface 1*a* of the base material 1, so that the void spaces 5 are in communication with the air, thus contributing to increasing the ink absorptivity, while, the void spaces which are trapped within the base material 1 serve to scatter incident light to make the paper opaque. When the synthetic paper is observed microscopically from above, a number of minute white spots are seen scattered in the base material 1 and one would think as if the base material per se were opaque. Thus, the synthetic paper of the present invention has texture similar to that of Japanese paper due to the effects of the void spaces 3 and 5.

Also, the void spaces are in communication with the air where the fiber material 2 is exposed on the surface, so that the synthetic paper has increased ink absorptivity. Furthermore, the spaces 3 also serve to connect with a number of void spaces which are formed around pigment 4. Thus, the void spaces 5 around the pigment 4 and the void spaces 3 around the fibrous material 2 are communicating with each other to form a continuous cellular structure, with a great increase in ink absorptivity. Preferably, at least 5% of the number of void spaces surrounding the pigment are communicating with the void spaces surrounding the fibrous filaments.

The Preparation of Synthetic Paper

Following is an example of a method for the preparation of synthetic paper having a structure of the nature as mentioned above.

First, a base material of a thermoplastic resin is admixed with a pigment and a fibrous material. Particularly, 100 parts by weight of polypropylene are mixed with 50 parts by weight of calcium carbonate powder and 5 parts by weight of a glass fiber under melting conditions. The melting temperature is determined at a value which is higher than the melting point of the thermoplastic resin but lower than the melting point of the fibrous material. With polypropylene and glass fiber, the melting temperature is preferred to be about 170° C.

Then, the resultant mixture is formed into a film, which is then stretched uniaxially or biaxially. That is, the mixture is press-molded at 200° C. to obtain a film, which is stretched at 140° C. at a stretching ratio of 50–600%. As a result, void spaces 3 and 5 are formed around the fillers (i.e., the pigment 4 and the fibrous material 2). The volume of the void spaces is 0.2 to 30 times, preferably 1 to 15 times, the volumes of the fibrous material and the pigment.

Thus, the synthetic paper of the present invention becomes white and opaque due to the pigment 4 and there appear threadlike white patterns in the paper by the action of the fibrous material 2, resulting in a texture similar to that of Japanese paper.

Furthermore, when a mixture of 20–90 parts by weight of polypropylene and 80–10 parts by weight of polyethylene is used as a thermoplastic resin, making the total amount 100 parts by weight, one can obtain a synthetic paper which is reduced in surface gloss and which has clear fibrous patterns therein.

Thereafter, when the thus obtained synthetic paper is immersed in a solvent for a short period of time to dissolve thin films deposited on the surfaces thereof, the void spaces which exist in the vicinity of the surfaces of the base material and which have been closed due to application of pressure during the molding operation are opened and brought into communication with the air, thus increasing the ink absorptivity of the paper.

The foregoing is considered as illustrative only of the principles of the invention. Further, since numerous modifications and changes will readily occur to those skilled in the art, it is not desired to limit the invention the exact construction and composition shown and described. Accordingly, all suitable modifications and equivalents may be resorted to, falling within the scope of the invention as claimed.

If desired, a suitable additive such as an antioxidant, an ultraviolet ray absorbing agent, a fluorescent brightening agent or the like may be added to the resin mixture.

What is claimed is:

1. Synthetic paper comprising a film base material formed from a thermoplastic resin selected from the group consisting of polyethylene, polypropylene, polystyrene, polyvinyl chloride, copolymers using ethylene, propylene, styrene or vinyl chloride as a base material, and mixtures thereof, a number of threadlike fibrous filaments selected from the class consisting of organic natural and synthetic fibers and having a diameter in the range of from about 1μ to 50μ and a length in the range of from about 1mm to 5cm, said fibrous filaments each having a void space therearound and being present in an amount of about 2 to 80 parts by weight per 100 parts by weight of said base material, and a substantially spherical particulate pigment having a diameter in the range of from about 100Å to 50$\mu$, the particles of pigment each having a void space therearound and being present in an amount of about 5 to 40 parts by weight per 100 parts by weight of said base material, therein at least some of the void spaces formed around said pigment connect with at least some of the void spaces around said fibrous filaments.

2. Synthetic paper according to claim 1, wherein said thermoplastic resin is a mixture of 20–90 parts by weight of polypropylene and 80–10 parts by weight of polyethylene with a total of 100 parts by weight.

3. Synthetic paper according to claim 1, wherein said fibrous filaments are dispersed in the direction parallel to the plane of the surface of said film base material.

4. Synthetic paper according to claim 3, wherein said fibrous filaments are dispersed in cross relation with one another.

5. Synthetic paper according to claim 1, wherein said fibrous filaments are selected from the group consisting of polyester fiber, polyamide fiber, polyacrylonitrile fiber, polyvinylalcohol fiber, pulp fiber, cotton fiber, silk fiber, and rayon fiber.

6. Synthetic paper according to claim 1, wherein the void space around said fibrous filament has a width in the range of from about 100Å to 50$\mu$ and a length in the range of from about 1mm to 6cm.

7. Synthetic paper according to claim 1, wherein said pigment is selected from the group consisting of calcium carbonate, magnesium carbonate, titanium dioxide, calcium sulfate, calcium sulfite, clay, and zinc white.

8. Synthetic paper according to claim 1, wherein said pigment is surrounded by a substantially ovate void space having a width in the range of from about 50Å–50$\mu$.

9. Synthetic paper according to claim 1 wherein at least 5% of the number of void spaces surrounding said pigment are communicating with the void spaces surrounding said fibrous filaments.

* * * * *